US012743250B1

(12) United States Patent
Carlson

(10) Patent No.: US 12,743,250 B1
(45) Date of Patent: Sep. 22, 2026

(54) CIRCUIT AND METHOD FOR FLOATING-POINT ADDITION

(71) Applicant: Marvell Asia Pte Ltd, Singapore (SG)

(72) Inventor: David A. Carlson, Haslet, TX (US)

(73) Assignee: Marvell Asia Pte Ltd, Singapore (SG)

( * ) Notice: Subject to any disclaimer, the term of this patent is extended or adjusted under 35 U.S.C. 154(b) by 1009 days.

(21) Appl. No.: 17/725,207

(22) Filed: Apr. 20, 2022

(51) Int. Cl.
*G06F 7/485* (2006.01)

(52) U.S. Cl.
CPC .................................... *G06F 7/485* (2013.01)

(58) Field of Classification Search
CPC ........ G06F 7/487; G06F 7/5443; G06F 5/012; G06F 17/16
See application file for complete search history.

(56) References Cited

U.S. PATENT DOCUMENTS 5,027,308 A 6/1991 Sit et al.
5,212,803 A 5/1993 Uddenfeldt et al.
7,219,119 B2 5/2007 Briemle et al.
7,917,567 B1 * 3/2011 Mason .................... G06F 7/483 708/495
8,195,735 B2 6/2012 Hansen et al.
9,870,341 B2 1/2018 Badin et al.
10,409,887 B1 9/2019 Gauria et al.
10,489,481 B1 11/2019 Batruni
10,514,891 B1 12/2019 Yang et al.
12,417,077 B2 9/2025 Song
12,530,196 B2 1/2026 Bhardwaj et al.
2011/0153707 A1 6/2011 Ginzburg et al.
2015/0067010 A1 3/2015 Czajkowski
2017/0293471 A1 * 10/2017 Hormigo Aguilar ..... G06F 7/50
2018/0336165 A1 11/2018 Phelps et al.
2019/0042260 A1 2/2019 Ould-Ahmed-Vall et al.
2019/0079728 A1 * 3/2019 Langhammer ... H03K 19/17744
2019/0196788 A1 6/2019 Han et al.
2020/0356375 A1 11/2020 Jiang et al.
2021/0042086 A1 * 2/2021 Elliott ....................... G06F 7/50
(Continued)

OTHER PUBLICATIONS

J. Sohn et al., "A Fused Floating-Point Three-Term Adder", 2014. (Year: 2014).*

(Continued)

*Primary Examiner* — Emily E Larocque
*Assistant Examiner* — Maria De Jesus Rivera
(74) *Attorney, Agent, or Firm* — Hamilton, Brook, Smith & Reynolds, P.C.

(57) ABSTRACT

A circuit and corresponding method perform floating-point (FP) addition. The circuit computes exponent differences between exponents of a plurality of FP inputs and generates a plurality of aligned FP addends by aligning the plurality of FP inputs based on the exponent differences computed. The aligned FP addends of the plurality of aligned FP addends are at a higher FP precision relative to a lower FP precision of the plurality of FP inputs. The circuit generates a higher precision FP sum at the higher FP precision by summing the plurality of aligned FP addends, simultaneously. The circuit transforms the higher precision FP sum, at the higher FP precision, into a lower precision FP sum, at the lower FP precision. The circuit outputs the lower precision FP sum produced with reduced latency relative to a conventional adder that successively sums addends.

36 Claims, 11 Drawing Sheets

(56) References Cited

U.S. PATENT DOCUMENTS

2021/0263739 A1 8/2021 Norrie et al.
2021/0303302 A1 9/2021 Boswell et al.
2022/0101106 A1 3/2022 Van Der Wilk et al.
2022/0129245 A1* 4/2022 Burgess .............. G06F 7/49947
2023/0237122 A1 7/2023 Zhang et al.

OTHER PUBLICATIONS

Y. Tao et al., "Correctly Rounded Architectures for Floating-Point Multi-Operand Addition and Dot-Product Computation", 2013. (Year: 2013).*
A. Tenca, "Multi-operand Floating-point Addition", 2009. (Year: 2009).*
"Matrix multiplication" retrieved from the Internet on Dec. 6, 2021 at https://en.wikipedia.org/wiki/Matrix_multiplication.
"IEEE754" Wikipedia, retrieved from the Internet on Jan. 7, 2022 at https://en.wikipedia.org/wiki/IEEE_754.
"IEEE Standard 754 Floating Point Numbers," Mar. 16, 2020, GeeksforGeeks, retrieved from the Internet on Jan. 7, 2022 at https://www.geeksforgeeks.org/ieee-standard-754-floating-point-numbers/.
Floating Point Tutorial, "IEEE 754 Standard Floating Point Numbers," RF Wireless World, retrieved from the Internet on Jan. 18, 2022 at https://www.rfwireless-world.com/Tutorials/floating-point-tutorial.html.
"Hardware Matrix multiplication" retrieved from the Internet on Jan. 26, 2022 at https://maitrix.com/dsr-modular-computation/hardware-matrix-multiplication/.
"Fundamentals of Design for RF Wireless Power Transfer," Power Electronics News, Technical Articles, Mar. 19, 2021.
"What is 5G beamforming, beam steering and beam switching with massive MIMO," metaswitch, retrieved from the Internet on Jan. 28, 2022 at https://www.metaswitch.com/knowledge-center/reference/what-is-beamforming-beam-steering-and-beam-switching-with-massive-mimo.
"5G Explained—How 5G Works," EMF Explained 2.0, retrieved from the Internet on Jan. 28, 2022 at http://www.emfexplained.info/?ID=25916.
"Hardware-based floating-point design flow," Embedded Staff, Technical Article, Jan. 17, 2011.
Fruhlinger, "Beamforming explained: How it makes wireless communication faster," Networkworld, Oct. 15, 2019.
Saini, et al., "Floating Point Unit Implementation on FPGA," International Journal Of Computational Engineering Research, May-Jun. 2012, vol. 2, Issue No. 3, 972-976.
Rai, et al., "Design and Analysis of Matrix Multiplication using IEEE 754 Floating Point Multiplier Partition Technique," International Journal of Innovative Research in Science, Engineering and Technology, vol. 8, Issue 9, Sep. 2019, 9379-9386.
Sourabh, et al., "Design and Evaluation of Floating point Matrix Operations for FPGA based system design," ScienceDirect, 171 (2020) 959-968.
Jain, "Floating Point Representation—Basics," Dec. 4, 2021, GeeksforGeeks.org.
"IEEE 754 Standard—Overview," Altium, Sep. 13, 2017, Retrieved from the Internet at https://techdocs.altium.com/display/FPGA/IEEE+754+Standard+-+Overview.
"Carry-save adder," Wikipedia, retrieved from the Internet on Feb. 18, 2022 at https://en.wikipedia.org/wiki/Carry-save_adder.
Dhobale et al., "Implementation of 32 Bit Binary Floating Point Adder Using IEEE 754 Single Precision Format," IOSR Journal of VLSI and Signal Processing (IOSR-JVSP) vol. 5, Issue 1, Ver. I (Jan.-Feb. 2015), pp. 50-53 e-ISSN: 2319-4200,p-ISSN No. 2319-4197.
Arish et al., "An efficient floating point multiplier design for high speed applications using Karatsuba algorithm and Urdhva-Tiryagbhyam algorithm," 2015 International Conference on Signal Processing and Communication (ICSC), Noida, 2015, pp. 303-308.
Ghorpade et al., "Multiplier Design Using Carry Save Adder," International Journal of Advanced Research in Electrical, Electronics and Instrumentation Engineering, vol. 5, Issue 4, Apr. 2016, pp. 3335-3342.
U.S. Appl. No. 17/686,107, entitled "Hardware Device and Method for Floating-Point Matrix Multiplication," filed Mar. 3, 2022.
U.S. Appl. No. 17/733,710 entitled "Hardware Device and Method for Matrix Operations," filed Apr. 29, 2022.

* cited by examiner

300

300-1

```
// This will add 4 numbers together. It adds 8b of precision to the add.
// inputs bits which don't fit within the expanded precision get dropped. There's no sticky bit.
module arx_add4(/*AUTOARG*/
  // Outputs
  result_2a,
  // Inputs
  clk, valid_1a, a_1a, b_1a, c_1a, d_1a
  );
import arx_defs::*;
input         clk;
input         valid_1a;
input arx_float36_t  a_1a;
input arx_float36_t  b_1a;
input arx_float36_t  c_1a;
input arx_float36_t  d_1a;

output arx_float36_t  result_2a;


// determine zero based solely on exponent. Denorms are not supported, mantissa is ignored when exponent is zero
wire    a_zero        = a_1a.exponent==8'h0;
wire    b_zero        = b_1a.exponent==8'h0;
wire    c_zero        = c_1a.exponent==8'h0;
wire    d_zero        = d_1a.exponent==8'h0;
```

300-2

```
// detect NotANumber (NaN). For NaN the output sign will always be zero and the mantissa will be cqnan(ie., the mantissa gets ignored for NaNs)
wire    nan_1a        = (&a_1a.exponent && a_1a.mantissa[26]) || (&b_1a.exponent && b_1a.mantissa[26]) || (&c_1a.exponent
&& c_1a.mantissa[26]) || (&d_1a.exponent && d_1a.mantissa[26]);
```

300-3

```
// detect infinity. The result sign when encountering infinity will be 0 if any infinity is 0. +inf-inf is not flagged as an error like IEEE 754
wire    inf_1a        = a_1a.exponent>=8'hff || b_1a.exponent>=8'hff || c_1a.exponent>=8'hff || d_1a.exponent>=8'hff;
wire    inf_sign_1a    = (a_1a.exponent>=8'hff ? a_1a.sign : '1) && (b_1a.exponent>=8'hff ? b_1a.sign : '1) && (c_1a.exponent>=8'hff ?
c_1a.sign : '1) && (d_1a.exponent>=8'hff ? d_1a.sign : '1);
```

FIG. 3A 300-4

```
// calculate exponent difference for all combinations
wire [8:0] ediff_ab    = {1'b0, a_1a.exponent} - {1'b0, b_1a.exponent};
wire [8:0] ediff_ac    = {1'b0, a_1a.exponent} - {1'b0, c_1a.exponent};
wire [8:0] ediff_ad    = {1'b0, a_1a.exponent} - {1'b0, d_1a.exponent};
wire [8:0] ediff_ba    = {1'b0, b_1a.exponent} - {1'b0, a_1a.exponent};
wire [8:0] ediff_bc    = { 1'b0, b_1a.exponent} - {1'b0, c_1a.exponent};
wire [8:0] ediff_bd    = {1'b0, b_1a.exponent} - {1'b0, d_1a.exponent};
wire [8:0] ediff_ca    = {1'b0, c_1a.exponent} - {1'b0, a_1a.exponent};
wire [8:0] ediff_cb    = {1'b0, c_1a.exponent} - {1'b0, b_1a.exponent};
wire [8:0] ediff_cd    = {1'b0, c_1a.exponent} - {1'b0, d_1a.exponent};
wire [8:0] ediff_da    = {1'b0, d_1a.exponent} - {1'b0, a_1a.exponent};
wire [8:0] ediff_db    = {1'b0, d_1a.exponent} - {1'b0, b_1a.exponent};
wire [8:0] ediff_dc    = {1'b0, d_1a.exponent} - {1'b0, c_1a.exponent};
```

300-5

```
// determine which exponent is the largest exponent. Multiple signals can assert if multiple inputs have the same largest exponent
wire      a_largest   = ~ediff_ab[8] && ~ediff_ac[8] && ~ediff_ad[8];
wire      b_largest   = ~ediff_ba[8] && ~ediff_bc[8] && ~ediff_bd[8];
wire      c_largest   = ~ediff_ca[8] && ~ediff_cb[8] && ~ediff_cd[8];
wire      d_largest   = ~ediff_da[8] && ~ediff_db[8] && ~ediff_dc[8];
```

300-6

```
// determine alignment shift amount for each input.
// Note that a zero input gets a large shift amount to effectively force the aligned result to be all zeros
wire [6:0]    shift_a_1a    = (a_zero ? 7'h40:'0) | (a_largest ? 7'b0 : b_largest ? {|ediff_ba[8:6],ediff_ba[5:0]}: c_largest ? {|ediff_ca[8:6],ediff_ca[5:0]} :
{|ediff_da[8:6],ediff_da[5:0]});
wire [6:0]    shift_b_1a    = (b_zero ? 7'h40:'0) | (b_largest ? 7'b0 : a_largest ? {|ediff_ab[8:6],ediff_ab[5:0]}: c_largest ? {|ediff_cb[8:6],ediff_cb[5:0]} :
{|ediff_db[8:6],ediff_db[5:0]});
wire [6:0]    shift_c_1a    = (c_zero ? 7'h40:'0) | (c_largest ? 7'b0 : a_largest ? {|ediff_ac[8:6],ediff_ac[5:0]} : b_largest ? {|ediff_bc[8:6],ediff_bc[5:0]} :
{|ediff_dc[8:6],ediff_dc[5:0]});
wire [6:0]    shift_d_1a    = (d_zero ? 7'h40:'0) | (d_largest ? 7'b0 : a_largest ? {|ediff_ad[8:6],ediff_ad[5:0]} : b_largest ? {|ediff_bd[8:6],ediff_bd[5:0]}
: {|ediff_cd[8:6],ediff_cd[5:0]});
```

FIG. 3B 300-7

```
// Fixup will contain the +1 terms needed for 2's complement negation for any input which got negated
wire [2:0]   fixup_1a = (a_1a.sign?3'h1:3'h0) + (b_1a.sign?3'h1:3'h0) + (c_1a.sign?3'h1:3'h0) + (d_1a.sign?3'h1:3'h0);
```

300-8

```
// Alignment shift. Note really large shift amounts(>=64) just force the value to zero
wire [38:0]    align_a_1a    = shift_a_1a[6] ? '0 : {4'b1, a_1a.mantissa, 8'b0}>>shift_a_1a[5:0];
wire [38:0]    align_b_1a    = shift_b_1a[6] ? '0 : {4'b1, b_1a.mantissa, 8'b0}>>shift_b_1a[5:0];
wire [38:0]    align_c_1a    = shift_c_1a[6] ? '0 : {4'b 1, c_1a.mantissa, 8'b0}>>shift_c_1a[5:0];
wire [38:0]    align_d_1a    = shift_d_1a[6] ? '0 : {4'b1, d_1a.mantissa, 8'b0}>>shift_d_1a[5:0];
```

300-9

```
// Perform summation along with the 1's complement
wire [38:0]    sum_1a        = (a_1a.sign ? ~align_ a_1a : align_a_1a) +
                              (b_1a.sign ? ~align_b_1a : align_b_1a) +
                              (c_1a.sign ? ~align_c_1a : align_c_1a) +
                              (d_1a.sign ? ~align_d_1a : align_d_1a) + {36'b0, fixup_1a[2:0]};
logic [38:0]    sum_2a;
logic [5:0]   clz_2a;
logic [5:0]   clo_2a;
logic [7:0]   exp_2a;
logic       inf_2a;
logic       inf_sign_2a;
logic       nan_2a;
wire        negate_2a  = sum_2a[38];
```

300-10

```
// calculate the normalization shift required. Note the sum could be negative
wire [5:0]     shift_2a  = negate_2a ? clo_2a : clz_2a;
```

300-11

```
// Perform normalization shift
wire [38:0]     norm_2a       = sum_2a[38:0] << shift_2a;
```

FIG. 3C 300-12
```
// Perform round add. Note that this step will also negate the sum if it was negative.
// Note the result of the round add could have a large enough carry to move the decimal point 1 place
wire [38:0]      round_2a   = (negate_2a ? ~norm_2a : norm_2a) + (negate_2a ? 39'h201 : 39'h200);
```

300-13
```
// cn_lint_off_line CN_PARTIAL_NET
// calculate the result exponent twice(since we don't yet know exactly where the decimal point is)
// also calculate if we under/overflowed twice
wire [8:0]     pexp0_2a   = {1'b0,exp_2a} - {3'b0,shift_2a} + 9'h2;
wire [8:0]     pexp1_2a   = {1'b0,exp_2a} - {3'b0,shift_2a} + 9'h3;
wire           overflow0_2a    = pexp0_2a[8:8-1]==2'b10 || pexp0_2a[8:0]==9'h0ff;
wire           overflow1_2a    = pexp1_2a[8:8-1]==2'b10 || pexp1_2a[8:0]==9'h0ff;
wire           underflow0_2a   = pexp0_2a[8:8-1]==2'b11 || ~|pexp0_2a || sum_2a==39'h0;
wire           underflow1_2a   = pexp1_2a[8:8-1]==2'b11 || ~|pexp1_2a || sum_2a==39'h0;
```

300-14
```
// nudge indicates where the decimal point is. We now can choose the correct under/overflow indicator and the output exponent
wire           nudge_2a   = round_2a[38];  // rounding tick the result up 1b
wire           overflow_2a    = (nudge_2a ? overflow1_2a  : overflow0_2a) || inf_2a;
wire           underflow_2a    =  nudge_2a ? underflow1_2a : underflow0_2a;
```

300-15
```
// assemble the output. Force values for exceptional cases(nan,inf,overflow,underflow).
assign         result_2a.sign        = nan_2a ? '0          : inf_2a ? inf_sign_2a : ~overflow_2a && underflow_2a ? '0 : negate_2a;
assign         result_2a.exponent    = nan_2a ? 8'hff       : overflow_2a ? '1 : underflow_2a ? '0 : nudge_2a ? pexp1_2a[8-1:0] : pexp0_2a[8-1:0];
assign         result_2a.mantissa    = nan_2a ? 27'h4000000 : overflow_2a ? '0 : underflow_2a ? '0 : nudge_2a ? round_2a[37:11] : round_2a[36:10];
```

FIG. 3D 300-16

```
// do a normalize shift, add to negate, add to round

always @(posedge clk) begin
   if (valid_1a) begin
    inf_2a          <= inf_1a;
    inf_sign_2a     <= inf_sign_1a;
    nan_2a          <= nan_1a;
    sum_2a          <= sum_1a;
    exp_2a          <= a_largest ? a_1a.exponent : b_largest ? b_1a.exponent : c_largest ? c_1a.exponent : d_1a.exponent;
    end
   end

// count leading zero's and one's
arx_clz #(.WIDTH(38), .CWIDTH(6)) clz(.in(sum_2a[37:0]), .out(clz_2a));
arx_clo #(.WIDTH(38), .CWIDTH(6)) clo(.in(sum_2a[37:0]), .out(clo_2a));

endmodule
```

FIG. 3E

CIRCUIT AND METHOD FOR FLOATING-POINT ADDITION

BACKGROUND

Matrix multiplication is a useful operation in linear algebra. Matrix multiplication is used in a wide variety of applications, such as image processing, digital signal processing (DSP), artificial intelligence (AI), and robotic applications, to name but a very few non-limiting example applications. Matrix multiplication is one non-limiting example of an operation that relies on addition of a set of numbers.

For example, when two matrices A and B are multiplied together, their product, also referred to as a matrix product, is a third matrix C that is based on dot (scalar) products. As is known, the matrices A and B can only be successfully multiplied (in that order) if the number of columns in A is the same as the number of rows in B. The matrix multiplication operation is written as C=AB, and an element $c_{ij}$ of the ith row and jth column of the matrix C is formed by taking the dot product of the ith row of A with the jth column of B.

A general definition of matrix multiplication is as follows: if A is an m×n matrix and B is an n×p matrix, the matrix product C will be an n×p matrix such that the general element $c_{ij}$ of C is given by $$c_{ij} = \sum_{k=1}^{n} a_{ik} b_{kj}.$$

As such, each element $c_{ij}$ of the matrix product C relies on the addition of a set of n numbers.

SUMMARY

According to an example embodiment, a circuit comprises an exponent comparison stage configured to compute exponent differences between exponents of a plurality of floating-point (FP) inputs. The circuit further comprises an alignment stage configured to generate a plurality of aligned FP addends by aligning the plurality of FP inputs based on the exponent differences computed. The plurality of aligned FP addends may be at a higher FP precision relative to a lower FP precision of the plurality of FP inputs. The circuit further comprises a summation stage configured to generate a higher precision FP sum at the higher FP precision by summing the plurality of aligned FP addends, simultaneously. The circuit further comprises a transformation stage configured to transform the higher precision FP sum, at the higher FP precision, into a lower precision FP sum, at the lower FP precision, and output the lower precision FP sum.

The higher FP precision includes a higher number of mantissa bits relative to a lower number of mantissa bits of the lower FP precision.

The plurality of FP inputs may include at least three FP inputs. The plurality of aligned FP addends may include at least three aligned FP addends. The summing may include summing the at least three aligned FP addends, simultaneously.

The plurality of FP inputs may include at least three FP products resulting from respective FP multiplication operations.

The exponent comparison stage may be further configured to compute the exponent differences, simultaneously.

The exponent comparison stage may include a plurality of subtractors. To compute the exponent differences, the exponent comparison stage may be further configured to employ the plurality of subtractors to compute, simultaneously for each FP input of the plurality of FP inputs, a respective exponent difference between an exponent of the FP input and each exponent of each other FP input of the plurality of FP inputs. Each respective exponent difference computed may use the exponent of the FP input as a minuend.

The exponent comparison stage may include digital logic configured to generate, simultaneously, for each FP input of the plurality of FP inputs, a respective signal indicating whether an exponent of the FP input is largest relative to each respective exponent of each other FP input of the plurality of FP inputs. The respective signal may be based on respective signs of the exponent differences computed. The aligning may be based on each respective signal generated.

Aligning the plurality of FP inputs based on the exponent differences computed may include employing temporary precision bits to extend respective mantissas of FP inputs of the plurality of FP inputs from the lower FP precision to the higher FP precision.

The alignment stage may include shifting circuitry. The aligning may include employing the shifting circuitry to right shift respective mantissas of the plurality of FP inputs, simultaneously, based on the exponent differences computed. The shifting circuitry may be configured to discard a mantissa bit in an event the mantissa bit is right shifted beyond the higher FP precision.

The aligning may include generating the plurality of aligned FP addends by employing the shifting circuitry to right shift, simultaneously, a respective mantissa of each FP input by a respective exponent difference of the exponent differences computed. The respective exponent difference may be computed between a respective exponent of the FP input and a largest exponent of exponents of the plurality of FP inputs.

The summing may include employing a ones' complement version of an aligned FP addend of the plurality of FP addends in an event the aligned FP addend is generated from a corresponding FP input of the plurality of FP inputs that has a negative sign.

The summing may include counting a total number of aligned FP addends of the plurality of aligned FP addends generated from a corresponding FP input of the plurality of FP inputs with a negative sign. The summation stage may be further configured to include the total number counted in the higher precision FP sum generated.

The summation stage may include a carry-save adder configured to sum the plurality of aligned FP addends, simultaneously, for non-limiting example.

The transformation stage may include a normalization stage configured to generate a normalized FP sum at the higher FP precision by normalizing the higher precision FP sum. The transformation stage may further include a rounding stage configured to generate the lower precision FP sum by rounding the normalized FP sum.

The transformation stage may be further configured to determine an exponent for the lower precision FP sum generated.

The transformation stage may be further configured to output the lower precision FP sum to at least one memory or at least one other circuit. The at least one other circuit may be configured to employ the lower precision FP sum to advance computation performed by the at least one other circuit.

The circuit may be incorporated into a hardware device. The hardware device may be configured to employ the lower precision FP sum to advance computation performed by the hardware device.

The hardware device may be a processor device.

According to another example embodiment, a method comprises computing exponent differences between exponents of a plurality of floating-point (FP) inputs. The method further comprises generating a plurality of aligned FP addends by aligning the plurality of FP inputs based on the exponent differences computed. The plurality of aligned FP addends is at a higher FP precision relative to a lower FP precision of the plurality of FP inputs. The method further comprises generating a higher precision FP sum at the higher FP precision by summing the plurality of aligned FP addends, simultaneously. The method further comprises transforming the higher precision FP sum at the higher FP precision into a lower precision FP sum at the lower FP precision and outputting the lower precision FP sum.

Alternative method embodiments parallel those described above in connection with the example circuit embodiment.

According to another example embodiment, a hardware device comprises at least one memory. The hardware device further comprises a circuit including an exponent comparison stage, an alignment stage, a summation stage, and a transformation stage. The hardware device further comprises at least one other circuit. The exponent comparison stage is configured to compute exponent differences between exponents of a plurality of floating-point (FP) inputs. The alignment stage is configured to generate a plurality of aligned FP addends by aligning the plurality of FP inputs based on the exponent differences computed. The aligned FP addend of the plurality of aligned FP addends are at a higher FP precision relative to a lower FP precision of the plurality of FP inputs. The summation stage is configured to generate a higher precision FP sum at the higher FP precision by summing the plurality of aligned FP addends, simultaneously. The transformation stage is configured to transform the higher precision FP sum, at the higher FP precision, into a lower precision FP sum, at the lower FP precision, and output the lower precision FP sum to the at least one memory or the at least one other circuit. The at least one other circuit is configured to employ the lower precision FP sum to advance computation performed by the hardware device.

Alternative hardware device embodiments parallel those described above in connection with the example circuit embodiment.

According to yet another example embodiment, an apparatus comprises means for computing exponent differences between exponents of a plurality of floating-point (FP) inputs. The apparatus further comprises means for generating a plurality of aligned FP addends by aligning the plurality of FP inputs based on the exponent differences computed. The aligned FP addends of the plurality of aligned FP addends are at a higher FP precision relative to a lower FP precision of the plurality of FP inputs. The apparatus further comprises means for generating a higher precision FP sum at the higher FP precision by summing the plurality of aligned FP addends, simultaneously. The apparatus further comprises means for transforming the higher precision FP sum at the higher FP precision into a lower precision FP sum at the lower FP precision and means for outputting the lower precision FP sum.

Alternative apparatus embodiments parallel those described above in connection with the example circuit embodiment.

It should be understood that example embodiments disclosed herein can be implemented in the form of a method, apparatus, or system.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 3A is Verilog code that represents an example embodiment of a hardware implementation disclosed herein.

FIG. 3B is a continuation of the Verilog code of FIG. 3A.

FIG. 3C is a continuation of the Verilog code of FIG. 3B.

FIG. 3D is a continuation of the Verilog code of FIG. 3C.

FIG. 3E is a continuation of the Verilog code of FIG. 3D.

DETAILED DESCRIPTION

Figure 1A:
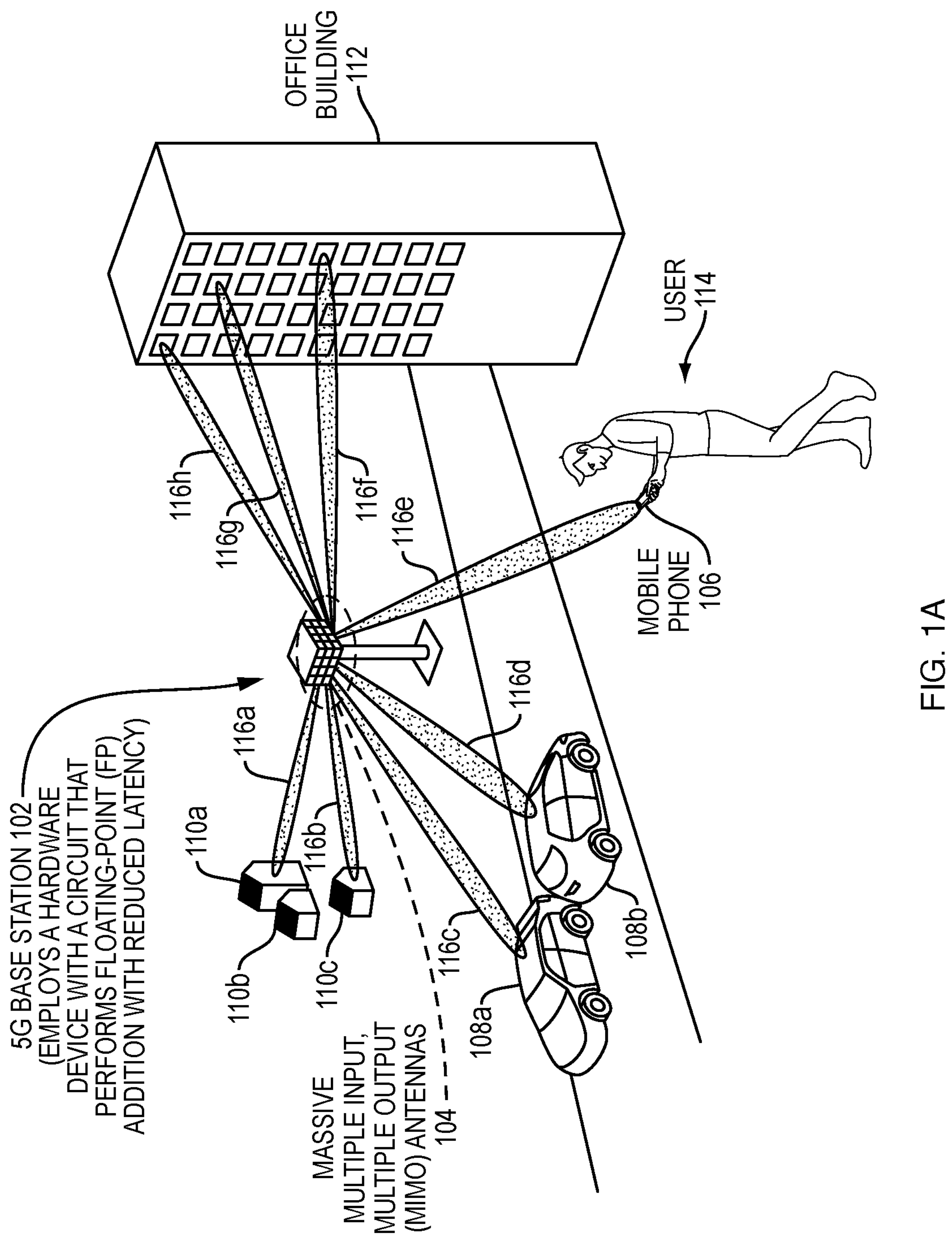
FIG. 1A is a block diagram of an example embodiment of a 5$^{th}$ generation (5G) base station that is implementing beamforming to focus respective wireless signals toward specific receiving devices.

A description of example embodiments follows.

At least one memory disclosed herein may include static random-access memory (SRAM), dynamic random-access memory (DRAM), other type of memory, or a combination thereof. The at least one memory may be internal to a hardware device, external to the hardware device, or a combination thereof. A floating-point (FP) addition operation disclosed herein may be a FP subtraction operation based on respective signs of the inputs (addends) to the FP addition operation. FP normalization and FP rounding operations disclosed herein may be implemented as is known in the art. A matrix, disclosed herein, may be a multi-dimensional matrix or a one-dimensional matrix (also referred to as a vector).

While an example embodiment(s) disclosed herein may be described with respect to a network, such as a cellular network, etc.; a technology, such as fifth generation (5G) technology, etc.; an application, such as a beam forming application, etc.; a system, such as a base station, etc.; or a device, such as a receiver/equalizer, mobile device, etc., it should be understood that such embodiment(s) is/are not limited thereto and that such embodiment(s) may be employed with regard to other types of networks, technologies, applications, systems, or devices not disclosed herein. Further, while an example embodiment(s) disclosed herein may be described as accelerating a matrix multiplication operation, it should be understood that such example embodiment(s) may be employed for accelerating other types of computational operations.

An example embodiment disclosed herein makes use of FP numbers and performs arithmetic operations on same. FP numbers are known in the art and are analogous to scientific notation. As is known in the art, FP circumvents the limitation of having a constant number of integer and fraction bits, allowing for representation of very large and very small numbers. Like scientific notation, a FP number has a sign, mantissa, radix (base), and an exponent. The sign is either a 1 (positive) or −1 (negative). The mantissa of the FP number, always a positive number, holds the significant digits of the FP number and represents the FP precision of the FP number. The exponent of the FP number indicates the positive or negative power of the radix that the mantissa and sign should be multiplied by. The four components of the FP number, namely the sign, mantissa, radix, and exponent, are combined as follows to form the FP number:

sign*mantissa*radix$^{exponent}$, where * denotes multiplication.

As is known in the art, decimal numbers use a radix of 10 whereas binary numbers use a radix of 2.

It should be understood that a FP number disclosed herein may be positive or negative and that an example embodiment of a mantissa, radix, and exponent disclosed herein is for illustrative purposes and that such mantissa, radix, and exponent are not limited to same. As such, representations of FP numbers disclosed herein are for illustrative purposes and non-limiting examples.

FP numbers, in general, have multiple representations because one can multiply the mantissa of any FP number by some power of the radix, and change the exponent to get the original number. For example, the number −5 can be represented equally by any of the following forms in radix 10 for non-limiting example:

TABLE 1

Floating-point representations of the number −5.

| Sign | Mantissa | Radix$^{exponent}$ |
|---|---|---|
| −1 | 50 | $10^{-1}$ |
| −1 | 5 | $10^{0}$ |
| −1 | 0.5 | $10^{1}$ |
| −1 | 0.05 | $10^{2}$ |

As is known in the art, there are many ways to represent FP numbers and, as such, the Institute of Electrical and Electronics Engineers (IEEE) created the IEEE 754 Floating-Point Standard in 1985 that defines a FP format for FP numbers. Such format was developed to resolve incompatibility issues resulting from use of incompatible FP formats between, for example, different computers. The IEEE 754 standard includes two representation types: 32-bit single-precision and 64-bit double-precision.

In the IEEE 754 32-bit single-precision FP representation, the most significant bit (MSB) is the sign bit, with 0 for positive numbers and 1 for negative numbers. The following 8 bits represent the exponent and the remaining 23 bits represent the mantissa. The representation for 64-bit double-precision is similar to the 32-bit single-precision. For example, the MSB is the sign bit, with 0 for positive numbers and 1 for negative numbers, the following 11 bits represent the exponent, and the remaining 52 bits represent the mantissa. For the IEEE 754 representation of the exponent, a so-called bias (or excess) is typically applied so as to represent both a positive and negative exponent. The bias is typically set at half of the range. For single-precision, the exponent (E) is in the range $1 \leq E \leq 254$, with excess of 127. As such, the actual exponent is from −126 to +127. Negative exponents are used to represent small numbers (<1.0); while positive exponents are used to represent large numbers (>1.0).

For example, for single precision with an 8-bit exponent, the bias is typically 127 (or excess −127). For double precision with an 11-bit exponent, the bias is typically 1023 (or excess −1023). The mantissa, also called the fraction or significand, represents the precision bits of the number and may be composed of an implicit leading bit (before the radix point) and the fractional bits (after the radix point). The leading bit for normalized numbers is 1. In normalized form, the radix point is placed after the first non-zero digit and the exponent adjusted as appropriate.

It should be understood that a FP, non-normalized number disclosed herein is a FP number that has not been normalized. In general, for each FP number, there is one representation that is said to be normalized. An example embodiment disclosed herein may normalize a FP number as is known in the art. A FP number is normalized if its mantissa (significand) is within the following range:

$$1 <= mantissa < 2.$$

For example, in the IEEE 754 single-precision format, the normalized value has an assumed '1' for the hidden $24^{th}$ bit of the mantissa (significand), directly after which the radix point follows. A normalized FP value can be summarized via the following expression: $s \times 2^{e-b} \times 1.f$, where s is defined by the sign bit; e is the biased exponent; b is the bias value of 127; and f is the 23-bit value of the mantissa (fraction, significand), to the right of the radix point. The 24-bit mantissa (i.e., 1.f) of a normalized binary FP number will, therefore, be in the range 1<=mantissa <2, as noted above. For example, in the normalized form, −0.5 may be expressed as $-1 \times 2^{-1} \times 1.0$, encoded as sign=1 (where '1' denotes a negative sign), exponent=126, and f=0, and represented as 10111111000000000000000000000000 in binary form or as 0xbf000000 in hexadecimal form. In the normalized form, there is only a single non-zero digit before the radix point. Normalization of positive and negative FP numbers is known in the art and the details for implementing normalization are not disclosed herein. An example embodiment disclosed herein may normalize a FP number and is not limited to any particular method for implementing such normalization.

In embedded computing, processing operations are often implemented in hardware, that is, in an integrated circuit, such as a microprocessor, application-specific integrated circuit (ASIC), system-on-a-chip (SoC), or field-programmable gate array (FPGA) for non-limiting examples. To implement such processing operations, fixed-point or integer-based representation of values is often used due to the simpler circuitry and lower power needed to implement fixed-point processing compared to FP processing. Applications in wireless communications, radar, medical imaging, and motor control are a few non-limiting examples of applications that could all benefit from the high dynamic range afforded by FP processing operations. Such applications often implement processing that involves linear algebra and linear algebra typically involves matrix multiplication which, in turn, relies on the addition of sets of numbers.

Based on dimensions of the matrices being multiplied, FP matrix multiplication may involve a large number of FP multiplication operations and an even larger number of FP addition (accumulation, summation) operations. Conventional solutions for implementing such FP addition operations employ IEEE 754 2-input adders to successively sum up a result. An example embodiment accelerates such FP addition operations relative to successive summation and, thus, reduces latency of an application that performs computations based on FP addition operations, such as a beamforming application disclosed below with regard to FIG. 1A for non-limiting example.

FIG. 1A is a block diagram of an example embodiment of a $5^{th}$ generation (5G) base station 102 that is implementing beamforming to focus respective wireless signals toward specific receiving devices, rather than having the signals spread in all directions from a broadcast antenna. The 5G base station 102 employs "massive" multiple input, multiple output (MIMO) antennas 104 that have very large numbers of antenna elements/connections to send and receive more data, simultaneously. 5G user equipment, such as the mobile phone 106, autonomous vehicles 108*a* and 108*b*, and other devices (not shown), such as 5G phones, tablets, Internet of Things (IoT) devices, etc., in the homes 110*a*, 110*b*, and 110*c* and the office building 112 for non-limiting examples, have MIMO antenna technology built into the user equipment for the millimeter wavelength frequencies of 5G. The benefit to a user, such as the user 114, is that the user 114 and other users (not shown) can simultaneously access a mobile network (not shown) and maintain high throughput.

Due to the high propagation loss of the millimeter wavelengths (mmWaves) employed in 5G, plus the high bandwidth demands of users, such as the user 114, beamforming may be implemented at the 5G base station 102 for increasing spectral efficiencies. Beamforming is an application that enables multiple radiating elements, transmitting the same signal at an identical wavelength and phase, to combine to create a single antenna with a longer, more targeted stream, such as the multiple beams 116*a*, 116*b*, 116*c*, 116*d*, 116*e*, and 116*f* for non-limiting example, which are formed by reinforcing the waves in a specific direction in the example embodiment.

The beamforming application enables the massive MIMO antennas 104 of the 5G base station 102 to direct the radio signal to the mobile phone 106 and other devices, rather than in all directions. Such beamforming may employ advanced signal processing methods to determine the best path for the radio signal to reach the device. This increases efficiency as it reduces interference (unwanted radio signals). Such signal processing methods may employ linear algebra and, more specifically, matrix multiplication for implementing the beamforming application. To accelerate computation of such matrix multiplication or another operation, the base station 102 may employ a hardware device that includes an example embodiment of a circuit that performs FP addition with reduced latency relative to conventional FP addition, as disclosed below with regard to FIG. 1B.

Figure 1B:
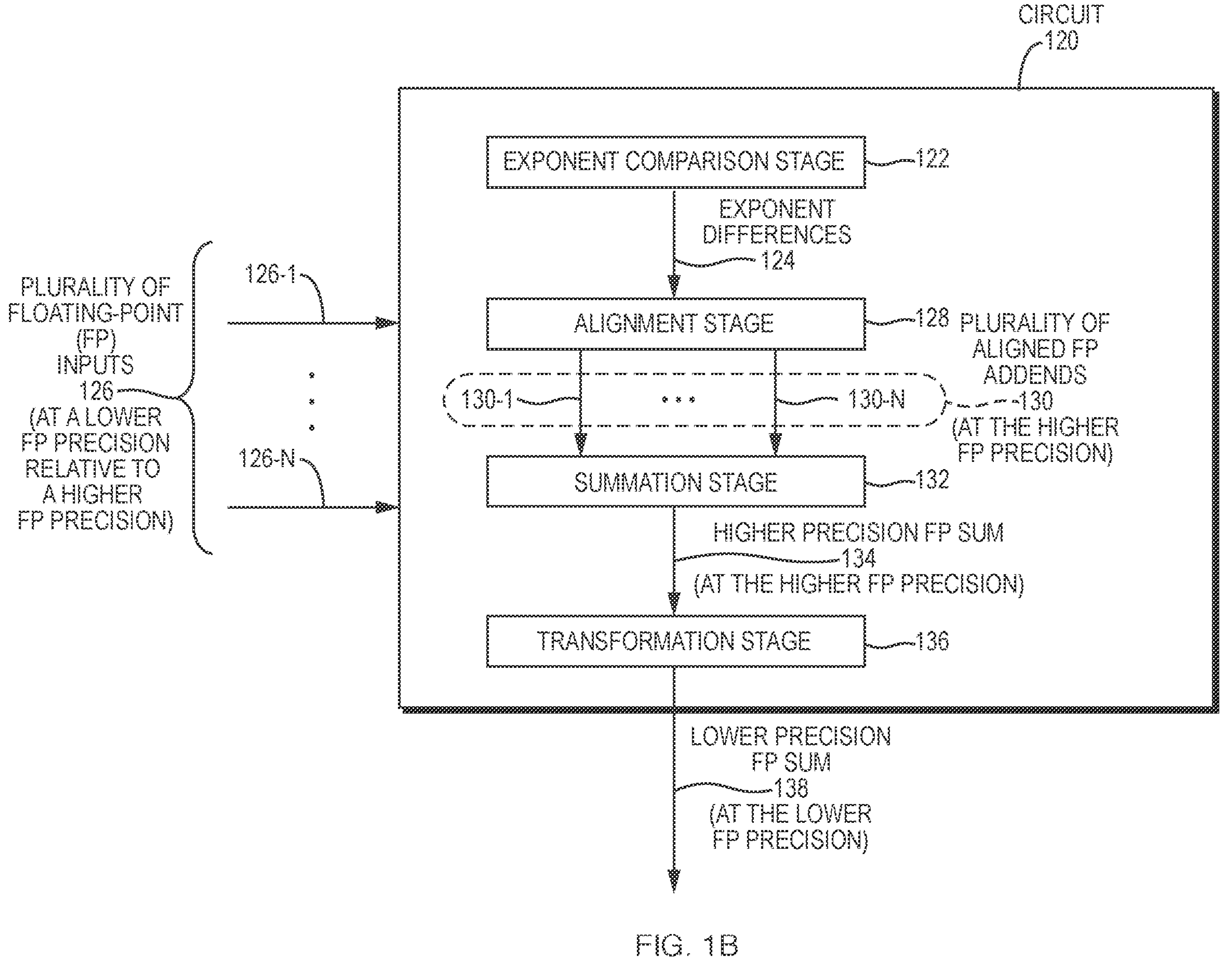
FIG. 1B is a block diagram of an example embodiment of a circuit that may be employed by the 5G base station of FIG. 1A.

FIG. 1B is a block diagram of an example embodiment of a circuit 120 that may be incorporated in a hardware device (not shown) of the 5G base station 102 of FIG. 1A. It should be understood that the hardware device is not limited to being employed by a base station and, thus, the circuit 120 is not limited to being incorporated by a hardware device of a base station. The circuit 120 may be employed in a hardware device that performs operations based on floating-point (FP) addition for an application, such as beam forming and machine learning for non-limiting examples. The circuit 120 performs the FP addition with reduced latency relative to conventional FP addition as disclosed further below.

In general, FP math is performed almost exclusively in microprocessors. Microprocessors tend to operate on data strictly with two operands, such as a result=A op B. An exception to this is the fused multiply/add operation where the result, equal to A*B+C, has 3 operands. For arithmetic-based applications, such as beam forming and machine learning for non-limiting examples, a principal operation targeted for acceleration is matrix multiplication. The inner loop of matrix multiplication is the summation of a plurality of N products. Conventional methods employ 2-input adders which successively sum up all the N products.

For example, a conventional method for adding together the N products includes adding the first two products to produce a sum, and then adding the sum to a next product to produce a next sum, and so on, via a tree of adders. As such, a conventional method employs N−1 adders with a total latency of log 2N. According to an example embodiment disclosed further below, three or more addends may be added at the same time. If four-input adders are used, then (N−1)/3 adders are needed with a latency of log 4N.

As is known in the art, to add N FP inputs together, the largest input is determined by comparing the exponents of all inputs. The mantissas of the remaining inputs are right shifted to align the decimal points and convert to signed integer. According to an example embodiment, K bits of temporary precision may be employed for such right shifting, as disclosed further below with regard to FIG. 1C. For example, a number of bits employed for a mantissa of an addend may be extended by the temporary precision bits such that when the addend is right shifted, the addend may be shifted into the additional K bits, and shifts beyond the K bits will get dropped (discarded). According to an example embodiment, no notion of a "sticky" bit exists to record bits of value '1' that are shifted beyond such precision. Following such shifting, the N aligned FP addends are then added together. At this point the result (sum) may go through a conventional flow, that is, the result is negated if negative, the leading zero count is determined, the result is left shifted to normalize, an additional add is employed to round the result, and the result may be checked for underflow/overflow as disclosed below with regard to FIG. 1B.

In the example embodiment of FIG. 1B, the circuit 120 comprises an exponent comparison stage 122 configured to compute exponent differences 124 between exponents (not shown) of a plurality of floating-point (FP) inputs 126. The circuit 120 further comprises an alignment stage 128 configured to generate a plurality of aligned FP addends 130 by aligning the plurality of FP inputs 126 based on the exponent differences 124 computed. The plurality of aligned FP addends 130, namely the aligned FP addends 130-1, . . . , 103-N, are at a higher FP precision relative to a lower FP precision of the plurality of FP inputs 126, namely the FP inputs 126-1, . . . , 126-N. The circuit 120 further comprises a summation stage 132 configured to generate a higher precision FP sum 134 at the higher FP precision by summing the plurality of aligned FP addends 130, simultaneously. The circuit 120 further comprises a transformation stage 136 configured to transform the higher precision FP sum 134, at the higher FP precision, into a lower precision FP sum 138, at the lower FP precision, and output the lower precision FP sum.

According to an example embodiment, the plurality of FP inputs 126 may include at least three FP inputs. The plurality of aligned FP addends 130 may include at least three aligned FP addends. The summing may include summing the at least three aligned FP addends, simultaneously. The plurality of FP inputs 126 may include at least three FP products resulting from respective FP multiplication operations for non-limiting example.

The higher FP precision includes a higher number of mantissa bits relative to a lower number of mantissa bits of the lower FP precision. For example, aligning the plurality of FP inputs based on the exponent differences computed may include employing temporary precision bits to extend respective mantissas of FP inputs of the plurality of FP inputs 126 from the lower FP precision to the higher FP precision as disclosed below with regard to FIG. 1C.

Figure 1C:
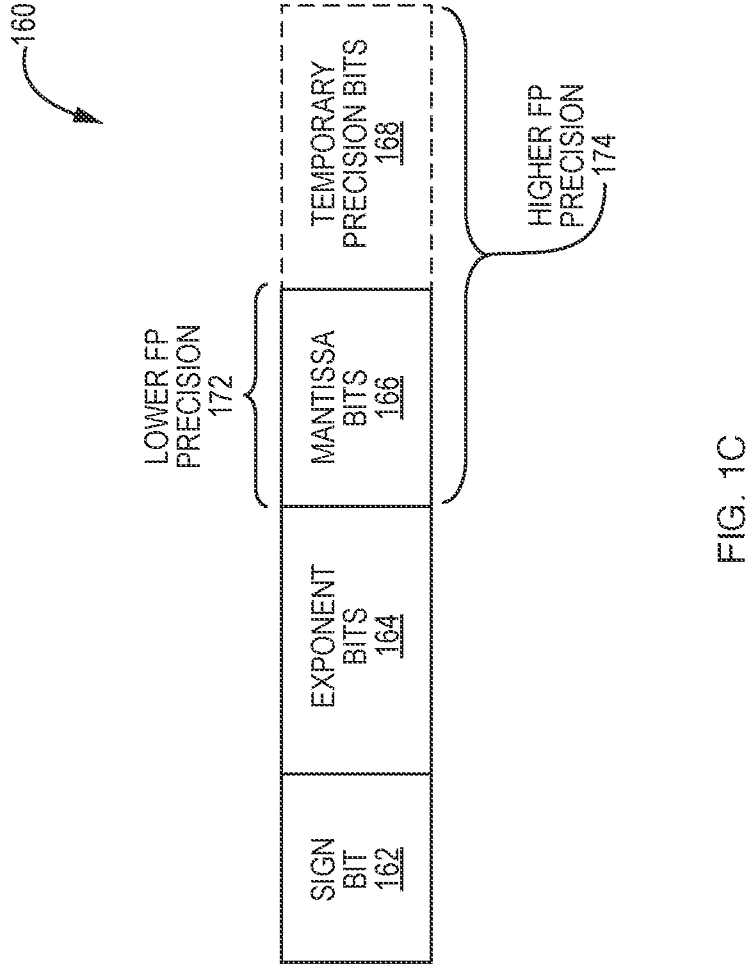
FIG. 1C is block diagram of an example embodiment of a floating-point (FP) number.

FIG. 1C is block diagram of an example embodiment of a FP number 160. The FP number includes a sign bit 162, exponent bits 164, and mantissa bits 166. According to the example embodiment, temporary precision bits 168 are employed to extend a lower FP precision 172 of the FP number 160 to a higher FP precision 174. A total number of the mantissa bits 166 represents the lower FP precision 172 whereas the total number of the mantissa bits 166 and a total number of the temporary precision bits 168 represent the higher FP precision 174. An amount of temporary precision employed, that is, a total number of the temporary precision bits 168, may be arbitrary and based on a balance of power and area for a hardware device that incorporates the circuit 120.

As is known, FP addition of FP inputs is performed with respective mantissas of the FP addends aligned in such a way that the exponents of the FP addends are equal to a largest exponent of the exponents. Such alignment may be implemented by right shifting the mantissa bits 166 by an amount that is based on a difference between the exponent represented by the exponent bits 164 and the largest exponent. According to an example embodiment, n extended precision, that is, the temporary precision bits 168, may be employed for right shifting the FP number 160 to align the FP number 160 for FP addition. An amount to be shifted may be computed by the exponent comparison stage 122 of the circuit 120 of FIG. 1B, as disclosed below.

Continuing with reference back to FIG. 1B, the exponent comparison stage 122 is configured to compute the exponent differences 124 between exponents of the plurality of floating-point (FP) inputs 126 as disclosed above. The exponent comparison stage 122 may be further configured to compute the exponent differences 124, simultaneously.

The exponent comparison stage 122 may include a plurality of subtractors (not shown). To compute the exponent differences 124, the exponent comparison stage 122 may be further configured to employ the plurality of subtractors to compute, simultaneously for each FP input of the plurality of FP inputs 126, a respective exponent difference between an exponent of the FP input and each exponent of each other FP input of the plurality of FP inputs 126. Each respective exponent difference computed may use the exponent of the FP input as a minuend, such as disclosed further below with regard to FIG. 3B. Such computation enables respective differences between each exponent of the plurality of FP inputs 126 and a largest exponent of the exponents to be computed, simultaneously, absent a priori knowledge of which exponent of the exponents is the largest.

Continuing with reference to FIG. 1B, the exponent comparison stage 122 may include digital logic (not shown) configured to generate, simultaneously, for each FP input of the plurality of FP inputs 126, a respective signal (not shown) indicating whether an exponent of the FP input is largest relative to each respective exponent of each other FP input of the plurality of FP inputs 126. The respective signal may be based on respective signs of the exponent differences 124 computed. The aligning may be based on each respective signal generated, such as disclosed further below with regard to FIG. 3B.

Continuing with reference to FIG. 1B, aligning the plurality of FP inputs 126 based on the exponent differences 124 computed may include employing temporary precision bits, such as the temporary precision bits 168 disclosed above with regard to FIG. 1C, to extend respective mantissas (not shown) of the FP inputs of the plurality of FP inputs 126 from the lower FP precision to the higher FP precision.

The alignment stage 128 may include shifting circuitry (not shown). The aligning may include employing the shifting circuitry to right shift respective mantissas of the plurality of FP inputs 126, simultaneously, based on the exponent differences 124 computed. Shifters for performing same are known in the art. The shifting circuitry may be configured to discard a mantissa bit in an event the mantissa bit is right shifted beyond the higher FP precision.

For example, the lower FP precision may be 15-bits, that is, the FP inputs 126 may each have a 15b mantissa for non-limiting example. The FP inputs 126 may be received in normalized binary scientific notation, such as A and B, shown below for non-limiting example:

$$A = 1.000e^{*}2^{\wedge}0$$

$$B = 1.0007^{*}2^{\wedge} - 24$$

Assuming the higher FP precision is 32-bits for non-limiting example, after extending the precision with temporary precision bits and aligning A and B, the values for A and B are:

$$A = 1.000e0000\ 0000$$

$$B = 0.00000001\ 0007$$

Bits extending beyond the extended precision are, however, discarded (dropped) according to an example embodiment. Thus, since the extended precision is 32-bits, the 0007 part of the B addend above is dropped. In an IEEE-754 compliant adder this would result in setting the so called sticky bit. According to an example embodiment, however, there is no sticky bit and, thus, the 0007 part of the B addend above is dropped in the non-limiting example.

The aligning performed by the alignment stage 128 may include generating the plurality of aligned FP addends 130 by employing the shifting circuitry to right shift, simultaneously, a respective mantissa of each FP input by a respective exponent difference of the exponent differences 124 computed. The respective exponent difference may be computed between a respective exponent of the FP input and a largest exponent (not shown) of exponents of the plurality of FP inputs 126.

The summing performed by the summation stage 132 may include employing a ones' complement version of an aligned FP addend of the plurality of FP addends 130 in an event the aligned FP addend is generated from a corresponding FP input of the plurality of FP inputs 126 with a negative sign. Converting the aligned FP addend to its ones' complement version may be performed via exclusive- or (XOR) logic (not shown) included in the summation stage 132 for non-limiting example.

The summing may include counting a total number of aligned FP addends of the plurality of aligned FP addends 130 that are generated from a corresponding FP input of the plurality of FP inputs 126 with a negative sign. The summation stage 132 may be further configured to include the total number counted in the higher precision FP sum 134 generated.

The summation stage 132 may include a carry-save adder (not shown) configured to sum the plurality of aligned FP addends, simultaneously, for non-limiting example, to generate the higher precision FP sum 134. Carry-save adders are known in the art and may be employed to transform three or more input numbers to two numbers to perform addition of such three or more input numbers in roughly the same amount of time (e.g., within 10%) as adding two input numbers. As disclosed above, the transformation stage 136 is configured to transform the higher precision FP sum 134, at the higher FP precision, into a lower precision FP sum 138, at the lower FP precision. An example embodiment of the transformation stage 136 is disclosed below, with regard to FIG. 1D.

Figure 1D:
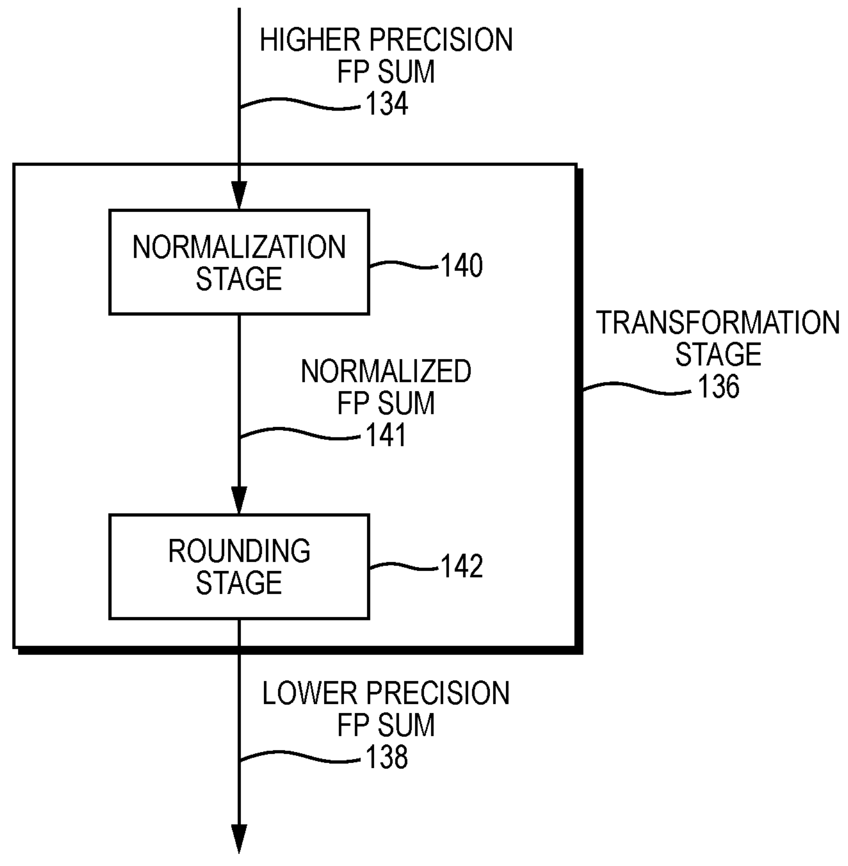
FIG. 1D is a block diagram of an example embodiment of a transformation stage of the circuit of FIG. 1B.

FIG. 1D is a block diagram of an example embodiment of the transformation stage 136 of the circuit 120 of FIG. 1B. The transformation stage 136 includes a normalization stage 140 configured to generate a normalized FP sum 141 at the higher FP precision by normalizing the higher precision FP sum 134. The transformation stage 136 further includes a rounding stage 142 configured to generate the lower precision FP sum 138 by rounding the normalized FP sum 141.

Normalizing the higher precision FP sum 134 may be performed as is known in the art. For non-limiting example, such normalizing may include counting a number of leading zeros of the higher precision FP sum 134 and shifting the higher precision FP sum 134 by same to produce a value that is between one and two, that is, a range for FP number as described above. After normalizing the higher precision FP sum 134, a number of bits of a mantissa of the higher precision FP sum 134 may be reduced to remove the temporary precision bits and produce the lower precision FP sum 134 at the lower FP precision, that is, the same precision of the plurality of FP inputs 126 that were input to the circuit 120. Such reducing of the mantissa bits may include rounding the mantissa as is known in the art, for example, by adding a value to round the mantissa up to the nearest integer value and truncating bits that extend beyond the lower FP precision.

The transformation stage 136 may be further configured to determine a sign and decimal point position for the lower precision FP sum 134 and may output same with indicators that indicate whether or not summation triggered underflow/overflow and whether or not the lower precision FP sum 134 is considered not a number (NaN) and/or infinity (+/−) as defined by IEEE754. Determination of such indicators is disclosed further below with regard to FIG. 3A.

Continuing with reference to FIGS. 1B and 1D, according to an example embodiment, if any of the aligned FP addends of the plurality of FP addends 130 is infinite, then the lower precision FP sum 134 is output from the transformation stage 136 with an infinity indicator asserted (active). Such an indicator may be utilized by a controller (not shown) to rescale the plurality of FP inputs 126, for example, to lower values. According to an example embodiment, if any of the aligned FP addends of the plurality of FP addends 130 has a value that is NaN, then the lower precision FP sum 134 result may be indicated as NaN.

In an event the plurality of aligned FP addends 130 include a first aligned FP addend that is NaN and a second aligned FP addend that is infinite, then the lower precision FP sum 134 is output from the transformation stage 136 with the NaN indicator asserted (active). Further, while IEEE754 may indicate addition of opposite signs of infinite values as being NaN, and example embodiment where the aligned FP addends of the plurality of FP addends 130 includes addends with positive and negative infinite values may output the lower precision FP sum 134 with a positive infinite value indicator asserted (active), to indicate to the controller that the plurality of FP inputs 126 should be rescaled.

With reference to FIGS. 1B and 1D, the transformation stage 136 may be further configured to determine an exponent for the lower precision FP sum 138 generated, as disclosed below with regard to a non-limiting example of operation of the circuit 120 in which the plurality of FP inputs 126 includes four FP inputs, namely A, B, C, and D, and the number of temporary (extra) precision bits for extending the lower FP precision of the four FP inputs to a higher FP precision is eight.

$$A = +1.3f \times 2^{\wedge}10 = 1276$$

$$B = -1.01 \times 2^{\wedge}9 = -514$$

$$C = -1.7e \times 2^{\wedge}9 = -763$$

$$D = +1.53 \times 2^{\wedge}3 = 10.59375$$

The exponent differences 124 in the non-limiting example include the following exponent difference with regard to the largest exponent, namely 10, that is, the exponent for A. A_diff=0, B_diff=1, C_diff=1, and D_diff=7

The plurality of FP addends 130 in the non-limiting example are the following:

A aligned is: 1.3f00

B aligned is: 0.8080, where the ones' complement is: f7f80

C aligned is: 0.bf00, where the ones' complement is: f4100

D aligned is: 0.02a6

The higher precision FP sum 134 of A, B, C, and D is: 0.02a7. Normalization of such a sum employs 7 bits, and the exponent will be: 10−7=3. The normalized sum is: 1.5380×2^3. Rounding the normalized sum yields 1.5380+0.008=1.54×2^3=10.625, that is, the lower precision FP sum 138 in the non-limiting example. According to the example embodiment of FIG. 1B, the addition of such four operands (addends), namely A+B+C+D is reduced to one macro-operation instead of three, with an additional latency of 2 gates, as disclosed with reference to the following non-limiting example.

With reference to FIG. 1B, the following is an example embodiment of a sequence of that may be performed by the circuit 120 for FP addition of the plurality of FP inputs 126:

1) Extend the lower FP precision of the FP inputs 126 to the higher FP precision and compute the differences in the exponent values via the exponent comparison stage 122.
2) Align decimal points of the FP addends via the alignment stage 128, as needed, via right shifting and discard mantissa bits that are shifted beyond the higher FP precision.
3) Negate, in the summation stage 132, using a 1's complement operation, the aligned FP addends that have a negative sign bit and count the total number of aligned FP addends that were negated.
4) Add the aligned FP addends together in the summation stage 132 to produce a sum and include the total number counted in the sum.

5) Count the leading zeroes (CLZ) of the sum in the transformation stage 136. Also determine in the transformation stage 136 if the sum is negative by checking the sign bit of the sum. For example, the most signification bit (MSB) may represent the sign.

6) Normalize the sum in the transformation stage 136 based on the CLZ result.

7) Round the sum in the transformation stage 136 and truncate the mantissa to be at the lower FP precision. The rounding may be performed by adding in a constant to round up the sum for the rounding and may conditionally add +1 for the negation (if the sum was negative).

8) Rounding may have moved the decimal point 1 position and, if so, the transformation stage 136 may perform a final 1-bit right-shift of the sum.

9) The transformation stage 136 may include a multiplexer (not shown) configured to mux in exceptional values (e.g., underflow, overflow, NaN, infinity) to the sum and output the sum as the lower precision FP sum 138.

The sequence 1)-9), disclosed above, may be considered a FP macro operation for FP addition. According to an example embodiment, when adding more than two numbers very few changes need to be made to the above sequence. For example, with regard to 1), above, the computation happens to all combinations of addends, simultaneously. So instead of one difference being calculated in the case of two numbers being adding, six differences get calculated for the case of four numbers being added, and so on. All of the difference calculations happen simultaneously so no additional latency is incurred for adding more than two numbers.

With regard to 2), above, there is no change with regard to latency when more than two numbers are added. The logic is replicated, based on how many numbers are being added; however, such logic is performed simultaneously (in parallel).

With regard to 3), above, there is no change with regard to latency when more than two numbers are added. The logic is replicated, based on how many numbers are being added; however, such logic is performed simultaneously (in parallel).

With regard to 4), above, adding four binary numbers is almost as fast as adding two numbers. For example, when using a carry-save adder to perform same the additional latency is an extra 2 gate delays.

Finally, with regard to 5-9), above, there is no change with regard to latency when more than two numbers are added. As such, while more logic may be needed for adding more than two addends, very little additional delay is added when generating the lower precision FP sum 138 from two FP inputs versus more than two FP inputs. According to an example embodiment, the transformation stage 136 may be further configured to output the lower precision FP sum 138 to at least one memory or at least one other circuit, as disclosed below with regard to FIG. 2.

Figure 2:
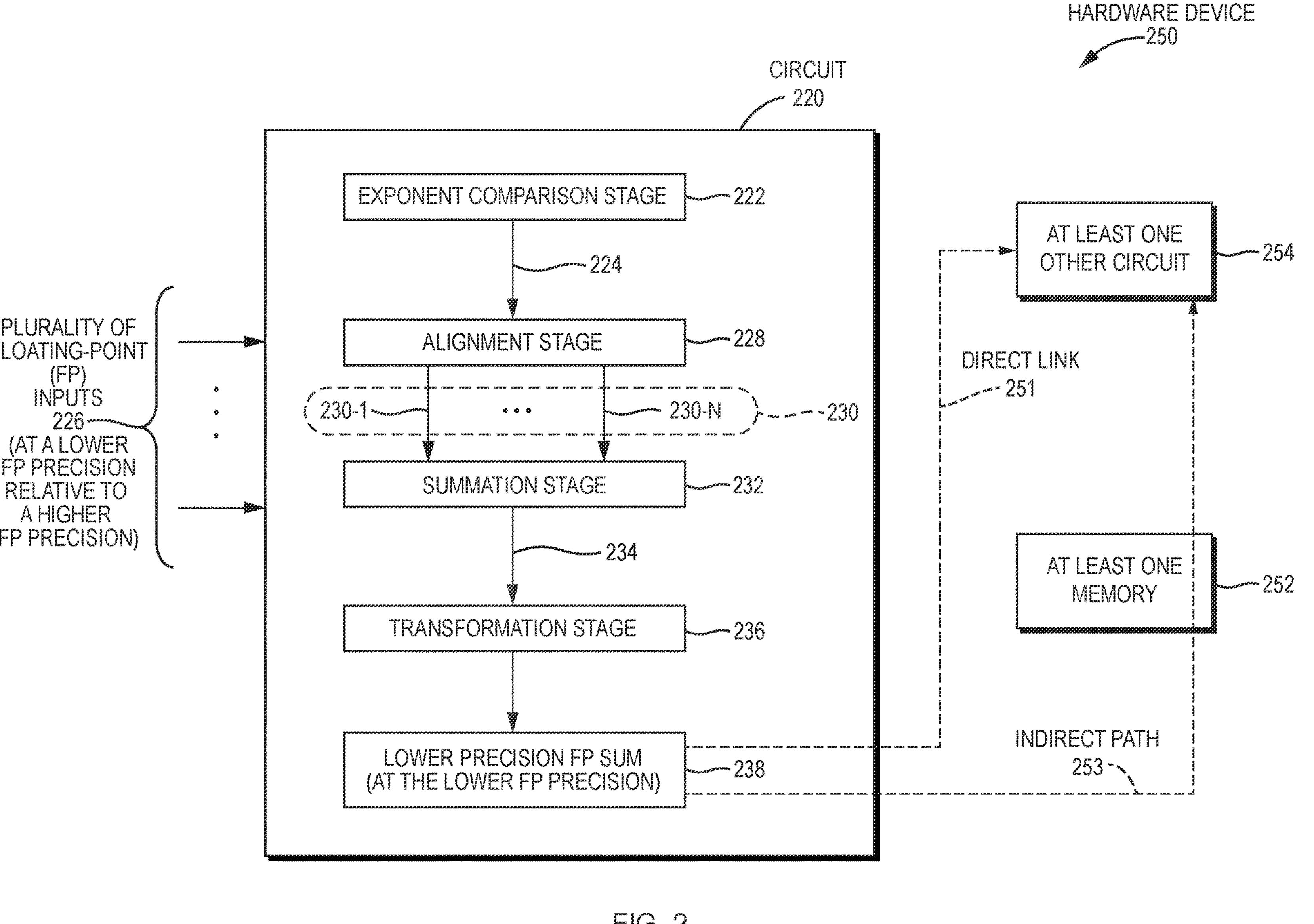
FIG. 2 is a block diagram of an example embodiment of a hardware device.

FIG. 2 is a block diagram of an example embodiment of a hardware device 250. According to an example embodiment, the hardware device 250 may be a processor device. In the example embodiment of FIG. 2, the hardware device 250 comprises at least one memory 252. The hardware device further comprises a circuit 220 including an exponent comparison stage 222, an alignment stage 228, a summation stage 232, and a transformation stage 236. The hardware device 250 further comprises at least one other circuit 254. The at least one other circuit 254 may be another instance of the circuit 220, that is, another FP adder, or may be a FP multiplier circuit for non-limiting example.

Similar to the circuit 120 of FIG. 1B, disclosed above, in the example embodiment of the circuit 220 of FIG. 2, the exponent comparison stage 222 is configured to compute exponent differences 224 between exponents of a plurality of floating-point (FP) inputs 226. The alignment stage 228 is configured to generate a plurality of aligned FP addends 230 by aligning the plurality of FP inputs 226 based on the exponent differences 224 computed. Each aligned FP addend (230-1, . . . , 230-N) of the plurality of aligned FP addends 230 is at a higher FP precision relative to a lower FP precision of the plurality of FP inputs 226.

The summation stage is configured to generate a higher precision FP sum at the higher FP precision by summing the plurality of aligned FP addends, simultaneously. The transformation stage 236 is configured to transform the higher precision FP sum 234, at the higher FP precision, into a lower precision FP sum 238, at the lower FP precision, and output the lower precision FP sum 238 to the at least one memory 252 or the at least one other circuit 252. Alternative embodiments of the circuit 220 parallel those described above in connection with the example circuit 120 embodiment.

Continuing with reference to FIG. 2, at least one other circuit 254 is configured to employ the lower precision FP sum 238 to advance computation performed by the hardware device 250. For non-limiting example, the plurality of FP inputs 226 may be a plurality of FP products of a matrix multiplication operation performed by the hardware device 250. The circuit 220 may be configured to generate the lower precision FP sum 238 that may be a sum of such FP products, with reduced latency relative to a conventional method that may sum such FP products, successively, as disclosed above. The hardware device 250 may employ the lower precision FP sum 238 as an element of a matrix product that may, in turn, be employed by the hardware device 250 for further processing performed for an application, such as the beamforming application of FIG. 1A, for non-limiting example.

Continuing with reference to FIG. 2, the lower precision FP sum 238 may be provided to the at least one other circuit 254, directly, such as via the direct link 251 that couples the circuit 220 and at least one other circuit 254, directly. Alternatively, the lower precision FP sum 238 may be provided to the at least one other circuit 254, indirectly, such as via the indirect path 253, in which the lower precision FP sum 238 is stored in the at least one memory 252 and retrieved at a later point in time from the at least one memory 252 by the at least one other circuit 254.

With regard to FIG. 1B and FIG. 2, the circuit 120 and circuit 220 may be generated based on Verilog code for non-limiting example. Verilog is a hardware description language (HDL) used to model digital circuits. A non-limiting example of Verilog code that may be used to model/generate a digital circuit implemented as the circuit 120 and circuit 220, where a number of the plurality of FP inputs 126 and plurality of FP inputs 226, respectively, is four for non-limiting example, is disclosed below with regard to FIGS. 3A-E. One skilled in the art will understand that the Verilog code 300 may be modified/scaled based on the number of FP inputs being more or less than four.

FIG. 3A is Verilog code 300 that represents an example embodiment of a hardware implementation for adding four FP number together for non-limiting example. The example embodiment employs eight bits of temporary precision for non-limiting example. The Verilog code 300 is described below with reference to FIG. 1B for non-limiting example.

With reference to FIGS. 1B and 3A, the Verilog code 300 includes an initialization section 300-1 that may be initialized via a hardware reset signal (not shown) to initialize values input to the circuit 120 and output from the circuit 120. The Verilog code 300 includes a detection section 300-2 to detect whether FP inputs of the plurality of FP inputs 126 represent a NaN based on respective exponents and mantissas of the plurality of FP inputs 126. The exponent comparison stage 122 may be configured to perform such NaN detection. The Verilog code 300 includes an infinity detection section 300-3 to detect whether FP inputs of the plurality of FP inputs 126 represent infinity based on exponents of the plurality of FP inputs 126 and may determine a sign (+/−) for infinity based on exponents and signs of the plurality of FP inputs 126. The exponent comparison stage 122 may be configured to perform such infinity detection.

FIG. 3B is a continuation of the Verilog code of FIG. 3A. With reference to FIGS. 1B and 3B, the Verilog code 300 includes an exponent-differences section 300-4. Such code may enable the exponent comparison stage 122 to be configured to compute the exponent differences 124 between exponents of the plurality of floating-point (FP) inputs 126, simultaneously. The exponent-differences section 300-4 may generate logic enabling the exponent comparison stage 122 to compute the exponent differences 124 via a plurality of subtractors to compute, simultaneously for each FP input of the plurality of FP inputs 126, a respective exponent difference between an exponent of the FP input and each exponent of each other FP input of the plurality of FP inputs 126. Each respective exponent difference computed may use the exponent of the FP input as a minuend as shown in the exponent-differences section 300-4.

The Verilog code 300 further includes a largest-exponent-determination section 300-5 that may generate digital logic included in the exponent comparison stage 122. Such digital logic may generate, simultaneously, for each FP input of the plurality of FP inputs 126, a respective signal (e.g., a_largest, b_largest, c_largest, d_largest) indicating whether an exponent of the FP input is largest relative to each respective exponent of each other FP input of the plurality of FP inputs 126. The respective signal may be based on respective signs of the exponent differences 124 computed as shown in the largest-exponent-determination section 300-5. The aligning may be based on each respective signal generated as shown in the alignment-shift-determiner section 300-6 that may be implemented in the alignment stage 128 of the circuit 120.

FIG. 3C is a continuation of the Verilog code of FIG. 3B. With reference to FIGS. 1B and 3B, the Verilog code 300 further includes a fixup-section 300-7. The fixup-section 300-7 may count a total number of FP addends that have a negative sign. The total number may be stored in memory and included in the higher precision FP sum 134 by the summation stage 132. The Verilog code 300 further includes an alignment section 300-8 that may generate shifting circuitry employed by the alignment stage 128. The alignment section 300-8 may generate shifting circuitry to right shift, simultaneously, a respective mantissa of each FP input by a respective exponent difference of the exponent differences 124 computed. The respective exponent difference may be computed between a respective exponent of the FP input and a largest exponent of exponents of the plurality of FP inputs 126 as shown in the alignment section 300-8 that produces the plurality of aligned FP addends 130 at the higher FP precision, namely, align_a_1a, align_b_1a, align_c_1a, and align_d_1a in the alignment section 300-8 for non-limiting example.

The Verilog code 300 further includes a summation section 300-9 that may generate logic for the summation stage 132. The summation section 300-9 employs a ones' complement version of an aligned FP addend of the plurality of FP addends 130 in an event the aligned FP addend is generated from a corresponding FP input of the plurality of FP inputs 126 with a negative sign. The summing of the summation section 300-9 includes the total count generated by the fixup section 300-7.

The Verilog code 300 further includes a normalize-shift section 300-10 that may generate logic for the transformation stage 136 to calculate a normalizing shift for normalizing the higher precision FP sum 134 generated by the summation stage 132. The normalization-shift section 300-10 shifts the higher precision FP sum 134 left, based on the shift amount determined by the normalize-shift section 300-10.

FIG. 3D is a continuation of the Verilog code of FIG. 3C. With reference to FIGS. 1B and 3B, the Verilog code 300 further includes a rounding section 300-12 that generates logic for rounding performed by the transformation stage 136 to round the normalized sum and truncates the mantissa to be at the lower FP precision. The rounding may be performed by adding in a constant to round up the sum for the rounding and may, conditionally, add +1 for the negation (if the sum was negative) as shown in the rounding section 300-12. Rounding may have moved the decimal point one position and, if so, the transformation stage 136 may perform a final 1-bit right-shift of the sum.

The Verilog code 300 further includes an exponent-determination section 300-13 to generate logic to determine the exponent of the output, that is the lower precision FP sum 138 output by the transformation stage 136. The exponent-determination section 300-13 also determines underflow and overflow indicators for the lower precision FP sum 138.

The Verilog code 300 further includes a nudge-section 300-14 to determine where the decimal point of the lower precision FP sum 138 should be and chooses the correct underflow/overflow indicator for the lower precision FP sum 138 in the transformation stage 136. The Verilog code 300 includes an output-assemble section 300-15 to assemble the output, that is, the lower precision FP sum 138 in which indicators for values of the exceptional cases (NaN, infinity, overflow, underflow) are determined.

FIG. 3E includes a continuation output-assemble section 300-16 that is a continuation of the output-assemble section 300-15 of FIG. 3D, disclosed above. With reference to FIG. 1B, FIG. 2, and FIGS. 3A-E, the Verilog code 300 enables logic to be generated for the circuit 120 and circuit 220 to implement a method for performing FP addition, such as the method of FIG. 4, disclosed below.

Figure 4:
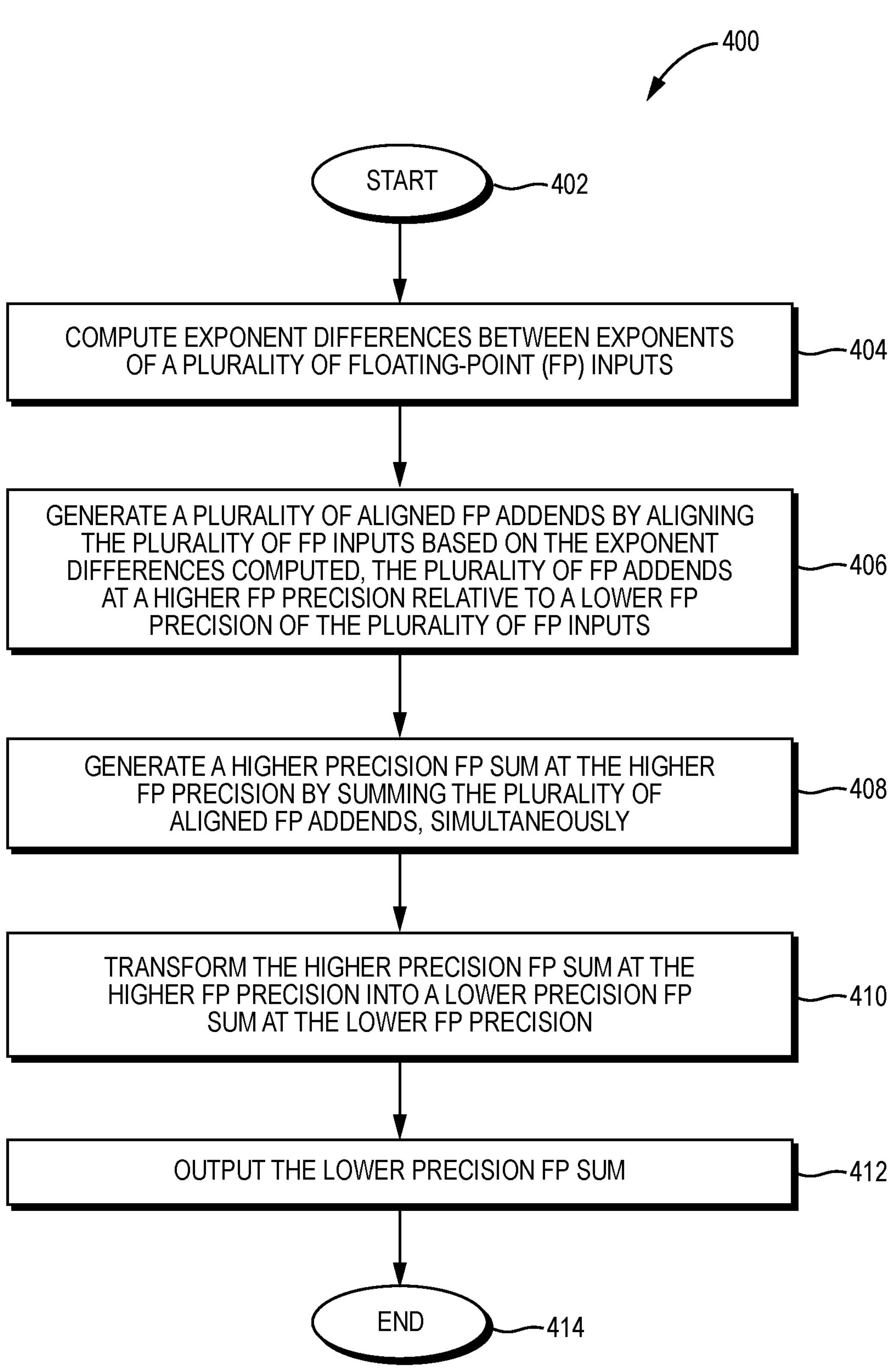
FIG. 4 is a flow diagram of an example embodiment of a method for performing FP addition.

FIG. 4 is a flow diagram of an example embodiment of a method 300 for performing FP addition. The method begins (402) and comprises computing exponent differences between exponents of a plurality of floating-point (FP) inputs (404). The method further comprises generating a plurality of aligned FP addends by aligning the plurality of FP inputs based on the exponent differences computed, the plurality of aligned FP addends at a higher FP precision relative to a lower FP precision of the plurality of FP inputs (406). The method further comprises generating a higher precision FP sum at the higher FP precision by summing the plurality of aligned FP addends, simultaneously (408). The method further comprises transforming the higher precision FP sum at the higher FP precision into a lower precision FP sum at the lower FP precision (410) and outputting the lower precision FP sum (412). The method thereafter ends (414) in the example embodiment.

Computing the exponent differences may include computing the exponent differences, simultaneously. Computing the exponent differences may include computing, simultaneously for each FP input of the plurality of FP inputs, a respective exponent difference between an exponent of the FP input and each exponent of each other FP input of the plurality of FP inputs, each respective exponent difference computed using the exponent of the FP input as a minuend.

The method may further comprise generating, simultaneously, for each FP input of the plurality of FP inputs, a respective signal indicating whether an exponent of the FP input is largest relative to each respective exponent of each other FP input of the plurality of FP inputs. The respective signal may be based on respective signs of the exponent differences computed. The aligning may be based on each respective signal generated.

The aligning may include employing temporary precision bits to extend respective mantissas of FP inputs of the plurality of FP inputs from the lower FP precision to the higher FP precision. The aligning may include right shifting respective mantissas of the plurality of FP inputs, simultaneously, based on the exponent differences computed and discarding a mantissa bit in an event the mantissa bit is right shifted beyond the higher FP precision. The aligning may include right shifting, simultaneously, a respective mantissa of each FP input by a respective exponent difference of the exponent differences computed. The respective exponent difference may be computed between a respective exponent of the FP input and a largest exponent of exponents of the plurality of FP inputs.

The summing may include employing a ones' complement version of an aligned FP addend of the plurality of FP addends in an event the aligned FP addend is generated from a corresponding FP input of the plurality of FP inputs with a negative sign. The summing may include counting a total number of aligned FP addends of the plurality of aligned FP addends generated from a corresponding FP input of the plurality of FP inputs with a negative sign. The summing may include the total number counted in the higher precision FP sum generated.

The method may further comprise employing a carry-save adder to sum the plurality of aligned FP addends, simultaneously, for non-limiting example.

The transforming may include generating a normalized FP sum at the higher FP precision by normalizing the higher precision FP sum. The transforming may further include generating the lower precision FP sum by rounding the normalized FP sum.

The method may further comprise determining an exponent for the lower precision FP sum generated.

The method may further comprise outputting the lower precision FP sum to at least one memory or at least one other circuit. The at least one other circuit may employ the lower precision FP sum to advance computation performed by the at least one other circuit.

Further example embodiments disclosed herein may be configured using a computer program product; for example, controls may be programmed in software for implementing example embodiments. Further example embodiments may include a non-transitory computer-readable-medium that contains instructions that may be executed by a processor, and, when loaded and executed, cause the processor to complete methods described herein. It should be understood that elements of the block and flow diagrams may be implemented in software or hardware, firmware, a combination thereof, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein. Further, example embodiments and elements thereof may be combined in a manner not explicitly disclosed herein.

While example embodiments have been particularly shown and described, it will be understood by those skilled in the art that various changes in form and details may be made therein without departing from the scope of the embodiments encompassed by the appended claims.

What is claimed is:

1. A circuit comprising:

an exponent comparison stage configured to compute exponent differences between exponents of a plurality of floating-point (FP) inputs;

an alignment stage configured to generate a plurality of aligned FP addends by aligning the plurality of FP inputs based on the exponent differences computed, the plurality of aligned FP addends at a higher FP precision relative to a lower FP precision of the plurality of FP inputs, the aligning including shifting of at least one FP input of the plurality of FP inputs, the shifting avoiding use of a sticky bit, the sticky bit otherwise used in recording shifting of the at least one FP input beyond the higher FP precision;

a summation stage configured to generate a higher precision FP sum at the higher FP precision by summing the plurality of aligned FP addends, simultaneously; and a transformation stage configured to transform the higher precision FP sum, at the higher FP precision, into a lower precision FP sum, at the lower FP precision, and output the lower precision FP sum.

2. The circuit of claim 1, wherein the higher FP precision includes a higher number of mantissa bits relative to a lower number of mantissa bits of the lower FP precision.

3. The circuit of claim 1, wherein the plurality of FP inputs includes at least three FP inputs, wherein the plurality of aligned FP addends includes at least three aligned FP addends, and wherein the summing includes summing the at least three aligned FP addends, simultaneously.

4. The circuit of claim 1, wherein the plurality of FP inputs includes at least three FP products resulting from respective FP multiplication operations.

5. The circuit of claim 1, wherein the exponent comparison stage is further configured to compute the exponent differences, simultaneously.

6. The circuit of claim 1, wherein the exponent comparison stage includes a plurality of subtractors, and wherein to compute the exponent differences, the exponent comparison stage is further configured to employ the plurality of subtractors to compute, simultaneously for each FP input of the plurality of FP inputs, a respective exponent difference between an exponent of the FP input and each exponent of each other FP input of the plurality of FP inputs that is different from the FP input, each respective exponent difference computed using the exponent of the FP input as a minuend.

7. The circuit of claim 1, wherein the exponent comparison stage includes digital logic configured to generate, simultaneously, for each FP input of the plurality of FP inputs, a respective signal indicating whether an exponent of the FP input is largest among respective exponents of each FP input of the plurality of FP inputs, the respective signal based on respective signs of the exponent differences computed, and wherein the aligning is based on each respective signal generated.

8. The circuit of claim 1, wherein aligning the plurality of FP inputs based on the exponent differences computed includes employing temporary precision bits to extend respective mantissas of FP inputs of the plurality of FP inputs from the lower FP precision to the higher FP precision.

9. The circuit of claim 1, wherein the alignment stage includes shifting circuitry, wherein the aligning includes employing the shifting circuitry to right shift respective mantissas of the plurality of FP inputs, simultaneously, based on the exponent differences computed, and wherein the shifting circuitry is configured to discard a mantissa bit in an event the mantissa bit is right shifted beyond the higher FP precision.

10. The circuit of claim 1, wherein the alignment stage includes shifting circuitry, wherein the aligning includes generating the plurality of aligned FP addends by employing the shifting circuitry to right shift, simultaneously, a respective mantissa of each FP input by a respective exponent difference of the exponent differences computed, and wherein the respective exponent difference is computed between a respective exponent of the FP input and a largest exponent of exponents of the plurality of FP inputs.

11. The circuit of claim 1, wherein, the summing includes employing a ones' complement version of an aligned FP addend of the plurality of FP addends in an event the aligned FP addend is generated from a corresponding FP input of the plurality of FP inputs with a negative sign.

12. The circuit of claim 1, wherein the summing includes counting a total number of aligned FP addends of the plurality of aligned FP addends generated from a corresponding FP input of the plurality of FP inputs with a negative sign and wherein the summation stage is further configured to include the total number counted in the higher precision FP sum generated.

13. The circuit of claim 1, wherein the summation stage includes a carry-save adder configured to sum the plurality of aligned FP addends, simultaneously.

14. The circuit of claim 1, wherein the transformation stage includes:

a normalization stage configured to generate a normalized FP sum at the higher FP precision by normalizing the higher precision FP sum; and a rounding stage configured to generate the lower precision FP sum by rounding the normalized FP sum.

15. The circuit of claim 1, wherein the transformation stage is further configured to determine an exponent for the lower precision FP sum generated.

16. The circuit of claim 1, wherein the transformation stage is further configured to output the lower precision FP sum to at least one memory or at least one other circuit, the at least one other circuit configured to employ the lower precision FP sum to advance computation performed by the at least one other circuit.

17. The circuit of claim 1, wherein the circuit is incorporated into a hardware device and wherein the hardware device is configured to employ the lower precision FP sum to advance computation performed by the hardware device.

18. The circuit of claim 17, wherein the hardware device is a processor device.

19. A method comprising:

computing exponent differences between exponents of a plurality of floating-point (FP) inputs;

generating a plurality of aligned FP addends by aligning the plurality of FP inputs based on the exponent differences computed, the plurality of aligned FP addends at a higher FP precision relative to a lower FP precision of the plurality of FP inputs, the aligning including shifting of at least one FP input of the plurality of FP inputs, the shifting avoiding use of a sticky bit, the sticky bit otherwise used in recording shifting of the at least one FP input beyond the higher FP precision;

generating a higher precision FP sum at the higher FP precision by summing the plurality of aligned FP addends, simultaneously;

transforming the higher precision FP sum at the higher FP precision into a lower precision FP sum at the lower FP precision; and outputting the lower precision FP sum.

20. The method of claim 19, wherein the higher FP precision includes a higher number of mantissa bits relative to a lower number of mantissa bits of the lower FP precision.

21. The method of claim 19, wherein the plurality of FP inputs includes at least three FP inputs, wherein the plurality of aligned FP addends includes at least three aligned FP addends, and wherein the summing includes summing the at least three aligned FP addends, simultaneously.

22. The method of claim 19, wherein the plurality of FP inputs includes at least three FP products resulting from respective FP multiplication operations.

23. The method of claim 19, wherein computing the exponent differences includes computing the exponent differences, simultaneously.

24. The method of claim 19, wherein computing the exponent differences includes computing, simultaneously for each FP input of the plurality of FP inputs, a respective exponent difference between an exponent of the FP input and each exponent of each other FP input of the plurality of FP inputs that is different from the FP input, each respective exponent difference computed using the exponent of the FP input as a minuend.

25. The method of claim 19, wherein the method further comprises generating, simultaneously, for each FP input of the plurality of FP inputs, a respective signal indicating whether an exponent of the FP input is largest among respective exponents of each FP input of the plurality of FP inputs, the respective signal based on respective signs of the exponent differences computed, and wherein the aligning is based on each respective signal generated.

26. The method of claim 19, wherein the aligning includes employing temporary precision bits to extend respective mantissas of FP inputs of the plurality of FP inputs from the lower FP precision to the higher FP precision.

27. The method of claim 19, wherein the aligning includes right shifting respective mantissas of the plurality of FP inputs, simultaneously, based on the exponent differences computed and discarding a mantissa bit in an event the mantissa bit is right shifted beyond the higher FP precision.

28. The method of claim 19, wherein the aligning includes right shifting, simultaneously, a respective mantissa of each FP input by a respective exponent difference of the exponent differences computed, and wherein the respective exponent difference is computed between a respective exponent of the FP input and a largest exponent of exponents of the plurality of FP inputs.

29. The method of claim 19, wherein the summing includes employing a ones' complement version of an aligned FP addend of the plurality of FP addends in an event the aligned FP addend is generated from a corresponding FP input of the plurality of FP inputs with a negative sign.

30. The method of claim 19, wherein the summing includes counting a total number of aligned FP addends of the plurality of aligned FP addends generated from a corresponding FP input of the plurality of FP inputs with a negative sign and including the total number counted in the higher precision FP sum generated.

31. The method of claim 19, further comprising employing a carry-save adder to sum the plurality of aligned FP addends, simultaneously.

32. The method of claim 19, wherein the transforming includes:

generating a normalized FP sum at the higher FP precision by normalizing the higher precision FP sum; and generating the lower precision FP sum by rounding the normalized FP sum.

33. The method of claim 19, further comprising determining an exponent for the lower precision FP sum generated.

34. The method of claim 19, further comprising outputting the lower precision FP sum to at least one memory or at least one other circuit, the at least one other circuit employing the lower precision FP sum to advance computation performed by the at least one other circuit.

35. A hardware device comprising:

at least one memory; and a circuit including an exponent comparison stage, an alignment stage, a summation stage, and a transformation stage, the exponent comparison stage configured to compute exponent differences between exponents of a plurality of floating-point (FP) inputs, the alignment stage configured to generate a plurality of aligned FP addends by aligning the plurality of FP inputs based on the exponent differences computed, the plurality of aligned FP addends at a higher FP precision relative to a lower FP precision of the plurality of FP inputs, the aligning including shifting of at least one FP input of the plurality of FP inputs, the shifting avoiding use of a sticky bit, the sticky bit otherwise used in recording shifting of the at least one FP input beyond the higher FP precision, the summation stage configured to generate a higher precision FP sum at the higher FP precision by summing the plurality of aligned FP addends, simultaneously, and the transformation stage configured to transform the higher precision FP sum, at the higher FP precision, into a lower precision FP sum, at the lower FP precision, and output the lower precision FP sum to the at least one memory or at least one other circuit of the hardware device, the at least one other circuit configured to employ the lower precision FP sum to advance computation performed by the hardware device.

36. An apparatus comprising:

means for computing exponent differences between exponents of a plurality of floating-point (FP) inputs;

means for generating a plurality of aligned FP addends by aligning the plurality of FP inputs based on the exponent differences computed, the plurality of aligned FP addends at a higher FP precision relative to a lower FP precision of the plurality of FP inputs, the aligning including shifting of at least one FP input of the plurality of FP inputs, the shifting avoiding use of a sticky bit, the sticky bit otherwise used in recording shifting of the at least one FP input beyond the higher FP precision;

means for generating a higher precision FP sum at the higher FP precision by summing the plurality of aligned FP addends, simultaneously;

means for transforming the higher precision FP sum at the higher FP precision into a lower precision FP sum at the lower FP precision; and means for outputting the lower precision FP sum.

* * * * *